United States Patent
Lin et al.

(10) Patent No.: US 7,771,618 B2
(45) Date of Patent: Aug. 10, 2010

(54) LIQUID CRYSTAL MATERIAL AND OPTICAL COMPENSATED BEND MODE LIQUID CRYSTAL DISPLAY

(75) Inventors: Hong-Cheu Lin, Hsinchu (TW); Ling-Yung Wang, Tainan County (TW); Hsin-Yi Tsai, Tainan County (TW); Chieh-Yin Tang, Miaoli County (TW); Chi-Neng Mo, Taoyuan County (TW); Shau-Lin Lyu, Taoyuan County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 0 days.

(21) Appl. No.: 12/331,432

(22) Filed: Dec. 10, 2008

(65) Prior Publication Data

US 2010/0134736 A1     Jun. 3, 2010

(30) Foreign Application Priority Data

Dec. 1, 2008    (TW) .............................. 97146624 A

(51) Int. Cl.
    *C09K 19/20*      (2006.01)
    *C09K 19/34*      (2006.01)
    *C09K 19/30*      (2006.01)
    *G02F 1/1333*     (2006.01)

(52) U.S. Cl. ................... 252/299.67; 349/167; 349/182; 252/299.61; 252/299.63

(58) Field of Classification Search ............ 252/299.61, 252/299.3, 399.67, 299.63; 428/1.1; 349/167, 349/182

See application file for complete search history.

(56) References Cited

U.S. PATENT DOCUMENTS 7,122,227 B2    10/2006    Vaughn-Spickers et al.

(Continued)

OTHER PUBLICATIONS

Cacalli et al., "DFT conformational study of banana-shaped mesogens", Chemical Physics 314:283-290, 2005.*

(Continued)

*Primary Examiner*—Shean C Wu
(74) *Attorney, Agent, or Firm*—Jianq Chyun IP Office

(57) ABSTRACT

A liquid crystal material including an optical compensated bend mode liquid crystal molecule and a bend molecule is provided. The bend molecule has a structure presented as formula (1):

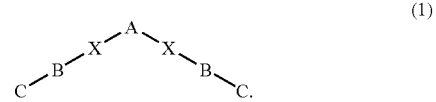

In formula (1), the symbol A represents one of the following formulas:

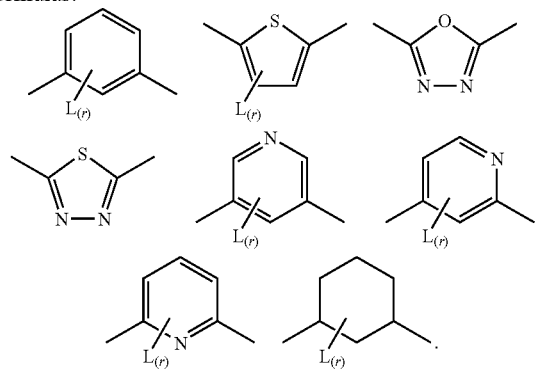

The symbol L represents hydrogen or fluorine, and the value r is one, two, three, four, five, six, seven or eight. Besides, the symbol X represents carboxyl group or cyano group. The symbol B represents one of the following formulas:

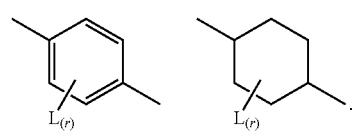

The symbol L represents hydrogen or fluorine, and the value r is one, two, three, four, five, six, seven or eight. The symbol C represents alkyl, alkoxyl, alkylcarbonyl or alkoxycarbonyl group with 1 to 12 carbon atoms.

10 Claims, 2 Drawing Sheets

U.S. PATENT DOCUMENTS

2003/0107701 A1* 6/2003 Shimoshikiryo et al. .... 349/172
2004/0033321 A1* 2/2004 Jakli et al. ................... 428/1.3
2005/0168663 A1* 8/2005 Miyachi et al. ............... 349/24
2007/0108408 A1* 5/2007 Kumar .................. 252/299.61

OTHER PUBLICATIONS

Pallavajhula et al., "Synthesis and Characterization of Bent Liquid Crystal Phases by Microscopy, Calorimetry, Spontaneous Polarization and Low-Frequency Dielectric Relaxation Studies in Bent-7", Ferroelectrics, 361:45-64, 2007.*

* cited by examiner

LIQUID CRYSTAL MATERIAL AND OPTICAL COMPENSATED BEND MODE LIQUID CRYSTAL DISPLAY

CROSS-REFERENCE TO RELATED APPLICATION

This application claims the priority benefit of Taiwan application serial no. 97146624, filed on Dec. 1, 2008. The entirety of the above-mentioned patent application is hereby incorporated by reference herein and made a part of specification.

BACKGROUND OF THE INVENTION

1. Field of the Invention

The present invention generally relates to a liquid crystal material and an optical compensated bend mode liquid crystal display using the same, in particular, to a liquid crystal material having a low bright-state driving voltage and a high response speed and an optical compensated bend mode liquid crystal display using the same.

2. Description of Related Art

Liquid crystal displays have become the mainstream of the market in recent years due to the advantages such as high definition, high space utilization efficiency, low voltage operation, and no radiation, and are gradually developing towards large size and wide viewing angle in order to meet the market demand.

In order to meet the requirements of wide viewing angle, twisted nematic (TN) liquid crystal display panels in combination with wide viewing-angle films, in-plane switching (IPS) liquid crystal display panels, fringe field switching liquid crystal display panels, and multi-domain vertical alignment (MVA) liquid crystal display panels are typically used in the prior art. Therefore, in most cases, special designs are implemented on the liquid crystal display panels in order to meet the requirements of wide viewing angle. However, implementing special designs on the liquid crystal display panels will increase the manufacturing complexity and cost.

In order to overcome the above problem, an optical compensated bend mode liquid crystal display (OCB Mode LCD) is developed in recent years. When the OCB Mode LCD displays, optical compensated bend mode liquid crystal molecules thereof are aligned in parallel on the upper and lower surfaces of glass substrates, and the optical compensated bend mode liquid crystal molecules between the glass substrates assume a bend state due to their bent alignment in the same plane. Such an alignment mode can overcome the optical property changes caused by tilting of the liquid crystal molecules at large viewing-angle positions of the liquid crystal display in the prior art. Therefore, the OCB Mode LCD has the advantage of wide viewing angle. Moreover, since no special designs are needed to be implemented on the liquid crystal display panel, common liquid crystal display processes are applicable, and thus the manufacturing cost will not be increased.

However, when the OCB Mode LCD is in a closed state (i.e., the optical compensated bend mode liquid crystal molecules are in a non-electric field state), the optical compensated bend mode liquid crystal molecules assume a splay state. That is to say, the optical compensated bend mode liquid crystal molecules are all parallel to the panel. Therefore, each time when the OCB Mode LCD is driven, a long preset time or a high bright-state driving voltage is required to enable the optical compensated bend mode liquid crystal molecules to be transitioned from the splay state into the bend state. Hence, there is an urgent need to reduce the preset time or bright-state driving voltage required for transition of the optical compensated bend mode liquid crystal molecules from the splay state into the bend state.

SUMMARY OF THE INVENTION

Accordingly, the present invention is directed to a liquid crystal material requiring a low bright-state driving voltage for transition from a splay state into a bend state and having a high response speed.

The present invention is also directed to an optical compensated bend mode liquid crystal display (OCB Mode LCD) having a low bright-state driving voltage and a high response speed.

In order to specifically describe the contents of the present invention, a liquid crystal material including an optical compensated bend mode liquid crystal molecule and a bend molecule is provided herein. The bend molecule has a structure presented as formula (1):

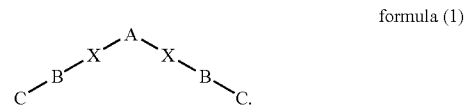

formula (1)

In formula (1), the symbol A represents one of the following formulas:

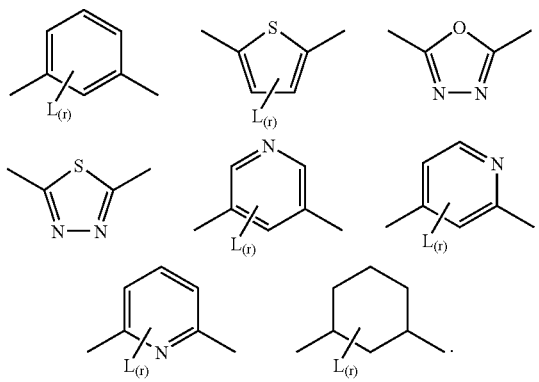

The symbol L represents hydrogen or fluorine, and the value r is one, two, three, four, five, six, seven or eight. Besides, the symbol X represents carboxyl group. The symbol B represents one of the following formulas:

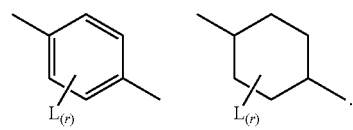

The symbol L represents hydrogen or fluorine, and the value r is one, two, three, four, five, six, seven or eight. The symbol C represents alkyl, alkoxyl, alkylcarbonyl or alkoxycarbonyl group with 1 to 12 carbon atoms.

In order to specifically describe the contents of the present invention, an OCB Mode LCD is provided herein. Such an OCB Mode LCD includes an active device array substrate, an opposite substrate, and a liquid crystal material. The opposite substrate has an opposite electrode. The liquid crystal material is disposed between the active device array substrate and the opposite substrate. The liquid crystal material includes an optical compensated bend mode liquid crystal molecule and a bend molecule. The bend molecule has a structure presented as formula (1):

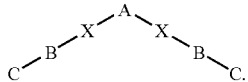

formula (1)

The symbol A represents one of the following formulas:

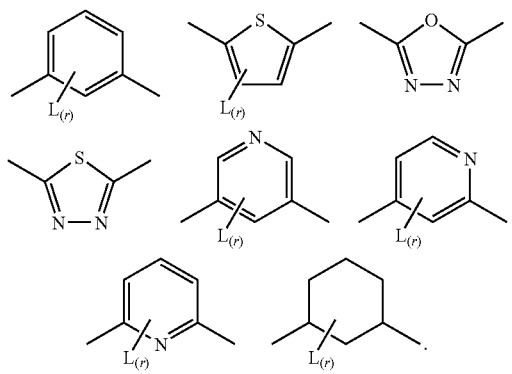

The symbol L represents hydrogen or fluorine, and the value r is one, two, three, four, five, six, seven or eight. Besides, the symbol X represents carboxyl group. The symbol B represents one of the following formulas:

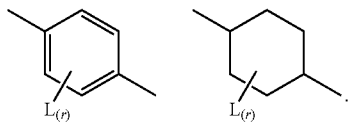

The symbol L represents hydrogen or fluorine, and the value r is one, two, three, four, five, six, seven or eight. The symbol C represents alkyl, alkoxyl, alkylcarbonyl or alkoxycarbonyl group with 1 to 12 carbon atoms.

In an embodiment of the present invention, the opposite substrate further includes a color filter layer, which is disposed below the opposite electrode.

In an embodiment of the present invention, the active device array substrate includes a plurality of scan lines, a plurality of data lines, a plurality of thin film transistors, and a plurality of pixel electrodes. The thin film transistors are respectively electrically connected to one of the scan lines and one of the data lines. The pixel electrodes are respectively electrically connected to one of the thin film transistors.

Embodiments applicable to both the liquid crystal material and the OCB Mode LCD described above are given below.

In an embodiment of the present invention, the structure of the bend molecule has at least one of the following structures presented as formulas (2) to (5):

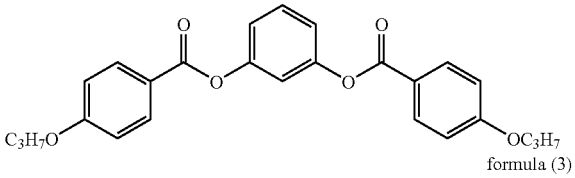

formula (2)

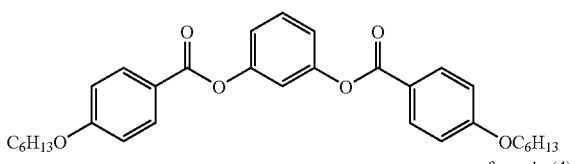

formula (3)

formula (4)

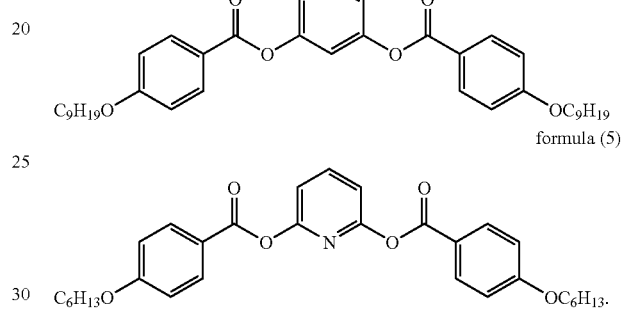

formula (5)

In an embodiment of the present invention, the weight ratio of the bend molecule to the optical compensated bend mode liquid crystal molecule is 0.01% to 5%.

In an embodiment of the present invention, the weight ratio of the bend molecule to the optical compensated bend mode liquid crystal molecule is 0.5%.

To sum up, the bend molecule of the liquid crystal material of the present invention can effectively reduce the bright-state driving voltage of the liquid crystal material and can also improve the response speed of the liquid crystal material.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
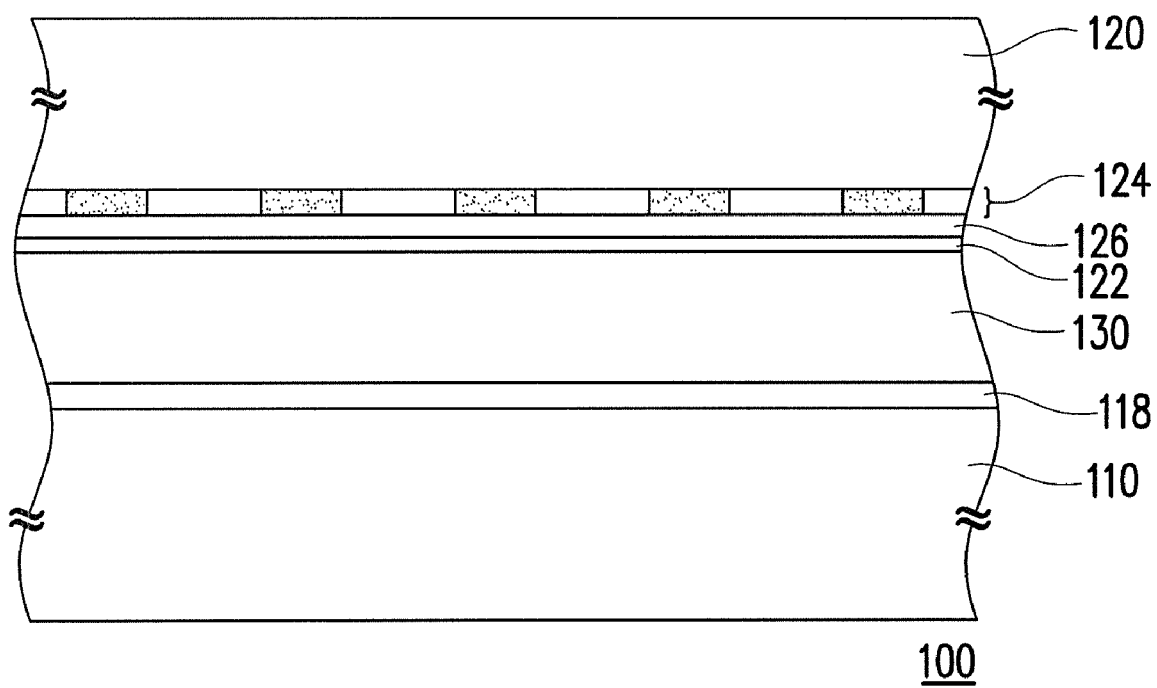
FIG. 1 is a cross-sectional view of an OCB Mode LCD according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

The present invention provides a liquid crystal material and an optical compensated bend mode liquid crystal display (OCB Mode LCD) using the same. The liquid crystal material includes an optical compensated bend mode liquid crystal molecule and a bend molecule. When such a liquid crystal material is applied to the OCB Mode LCD, the bend molecule can help the liquid crystal material to have a low bright-state driving voltage and a high response speed.

In an embodiment of the present invention, the liquid crystal material includes an optical compensated bend mode liquid crystal molecule and a bend molecule. The bend molecule has a structure presented as formula (1):

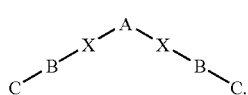

formula (1)

In formula (1), the symbol A represents one of the following formulas:

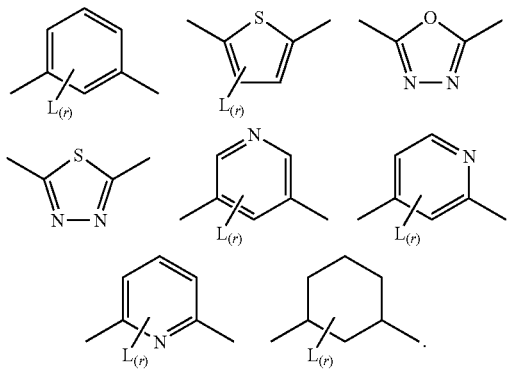

The symbol L represents hydrogen or fluorine, and the value r is one, two, three, four, five, six, seven or eight. The symbol X represents carboxyl group, and may be attached to position 1 or 3 of the symbol A such that the bend molecule has a bending molecular structure. The symbol B represents one of the following formulas:

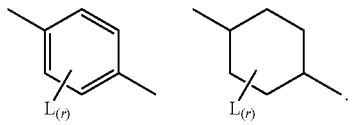

The symbol L represents hydrogen or fluorine, and the value r is one, two, three, four, five, six, seven or eight. The symbol C represents alkyl, alkoxyl, alkylcarbonyl or alkoxycarbonyl group with 1 to 12 carbon atoms.

In particular, the structure of the bend molecule is, for example, at least one of the following structures presented as formulas (2) to (5):

formula (2)

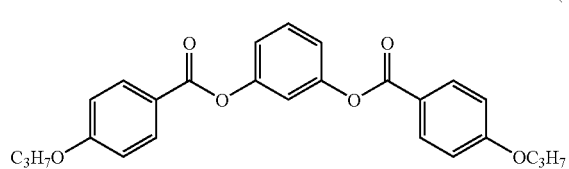

formula (3)

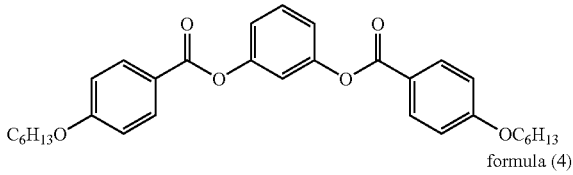

formula (4)

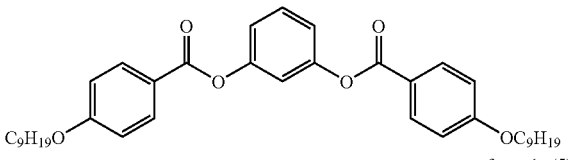

formula (5)

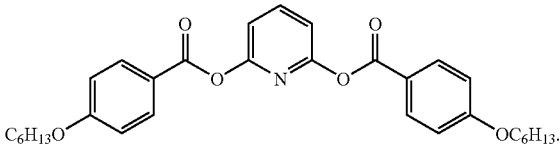

However, the present invention is not limited to this. That is to say, the bend molecule of the present invention may also be other bend molecules having the structure presented as formula (1).

The weight ratio of the bend molecule to the optical compensated bend mode liquid crystal molecule may be, but not limited to, 0.01% to 5%. In a preferred embodiment, the weight ratio of the bend molecule to the optical compensated bend mode liquid crystal molecule is 0.5%.

The bend molecule and the optical compensated bend mode liquid crystal molecule of the present invention are mixed at different weight percentages into the liquid crystal material of the present invention, and the bright-state driving voltage and response speed of the liquid crystal material are described below.

In this embodiment, the bend molecule of formula (2), (3), (4), or (5) is mixed at five different proportions of 0 wt %, 0.1 wt %, 0.5 wt %, 1 wt %, or 5 wt % with the optical compensated bend mode liquid crystal molecule (for example, ZCE-5096 liquid crystal produced by Merck company) to form a liquid crystal material. Next, the liquid crystal material is injected into a liquid crystal cell with an alignment layer (Mesostate LCD Industries Co., Ltd., the pitch of the liquid crystal cell is 4.25 µm). Then, 10 V and −10 V voltages are alternately applied to the liquid crystal cell, such that the liquid crystal material in the liquid crystal cell is maintained at the bend state for about 3 min. Afterward, the voltage applied to the liquid crystal cell is gradually reduced, and the voltage applied to the liquid crystal cell and corresponding light transmittance of the liquid crystal cell are recorded. When the light transmittance of the liquid crystal cell reaches the maximum value, the voltage applied to the liquid crystal cell at this time is the bright-state driving voltage. The experimental results are as shown in Table 1. Table 1 shows the bright-state driving voltage of the liquid crystal materials formed by mixing the bend molecules of formulas (2), (3), (4), and (5) at five different proportions of 0 wt %, 0.1 wt %, 0.5 wt %, 1 wt %, and 5 wt % with the optical compensated bend mode liquid crystal molecule.

TABLE 1

| Weight Percentage of Bend Molecule (wt %) | Bend Molecule | | | |
|---|---|---|---|---|
| | Formula (2) | Formula (3) | Formula (4) | Formula (5) |
| | Bright-state Driving Voltage of Bend Molecule (V) | | | |
| 0 | 1.9 | 1.9 | 1.9 | 1.9 |
| 0.1 | 1.83 | 1.85 | 1.79 | 1.72 |
| 0.5 | 1.78 | 1.38 | 1.78 | 1.60 |
| 1 | 1.73 | 1.72 | 1.87 | 1.79 |
| 5 | 1.65 | 1.48 | 1.76 | 1.65 |

Herein, the bright-state driving voltage of the pure optical compensated bend mode liquid crystal molecule is further measured at the same conditions, which is 1.9 V. As can be seen from Table 1, the bright-state driving voltages of the liquid crystal materials formed by mixing the bend molecules of formulas (2), (3), (4), and (5) with the optical compensated bend mode liquid crystal molecule are all lower than 1.9 V. Therefore, the bright-state driving voltage is surely reduced after the optical compensated bend mode liquid crystal molecule is mixed with the bend molecule. It is thus proved that the bend molecule of the liquid crystal material of the present invention can effectively reduce the bright-state driving voltage of the liquid crystal material.

In addition, in this embodiment, the response time of the liquid crystal material is also measured. That is to say, a first positive/negative voltage is continuously applied to the liquid crystal material to minimize the light transmittance of the liquid crystal material. Next, a second positive/negative voltage is applied to the liquid crystal material to maximize the light transmittance of the liquid crystal material from the minimum value. Then, the first positive/negative voltage is applied to the liquid crystal material again to minimize the light transmittance of the liquid crystal material from the maximum value. The total time required for the above process of maximizing the light transmittance of the liquid crystal material from the minimum value and minimizing the light transmittance of the liquid crystal material from the maximum value is the response time. Table 2 shows the response time of the liquid crystal materials formed by mixing the bend molecules of formulas (2), (3), (4), and (5) at four different proportions of 0.1 wt %, 0.5 wt %, 1 wt %, and 5 wt % with the optical compensated bend mode liquid crystal molecule.

TABLE 2

| Weight Percentage of Bend Molecule (wt %) | Bend Molecule | | | |
|---|---|---|---|---|
| | Formula (2) | Formula (3) | Formula (4) | Formula (5) |
| | Response Time of Bend Molecule (ms) | | | |
| 0.1 | 3.95 | 3.62 | 4.23 | 4.23 |
| 0.5 | 3.35 | 3.47 | 3.70 | 3.71 |
| 1 | 4.28 | 4.22 | 4.33 | 4.14 |
| 5 | 3.96 | 4.50 | 3.69 | 6.96 |

Herein, the response time of the pure optical compensated bend mode liquid crystal molecule is also measured at the same conditions, which is 4.57 ms. From Table 2, the response time of the liquid crystal materials formed by mixing the bend molecules of formulas (2), (3), (4), and (5) with the optical compensated bend mode liquid crystal molecule are all shorter than 4.57 ms. Therefore, the response time of the optical compensated bend mode liquid crystal molecule added with the bend molecule is surely shortened. That is to say, the response speed of the liquid crystal material of the present invention is higher than that of the optical compensated bend mode liquid crystal molecule. It is thus proved that the bend molecule of the liquid crystal material of the present invention can effectively improve the response speed of the liquid crystal material.

In view of the above, the bend molecule of the liquid crystal material of the present invention can effectively reduce the bright-state driving voltage of the liquid crystal material and improve the response speed of the liquid crystal material.

Figure 2:
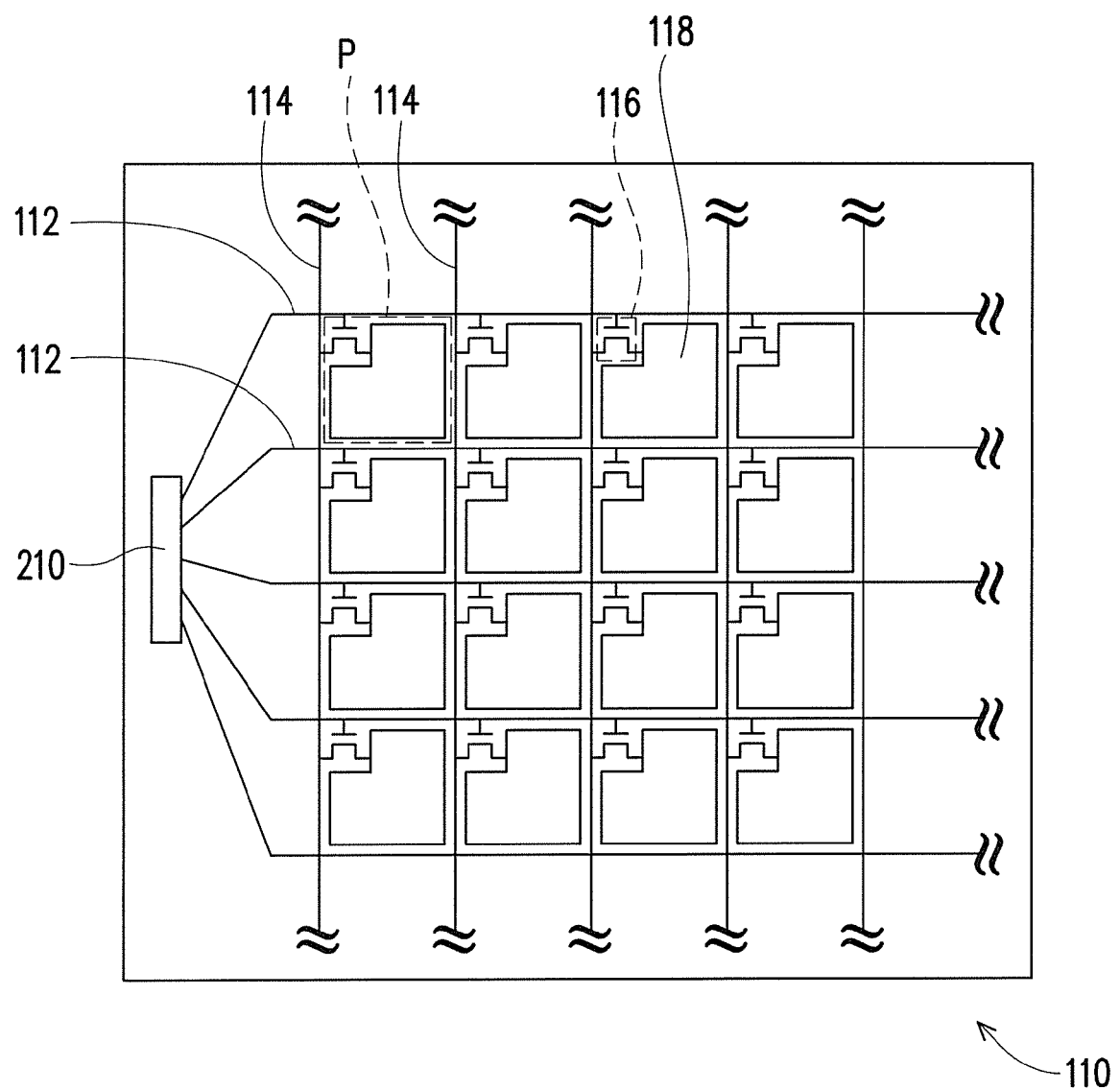
FIG. 2 is a top view of an active device array substrate in FIG. 1.

FIG. 1 is a cross-sectional view of an OCB Mode LCD according to an embodiment of the present invention, and FIG. 2 is a top view of an active device array substrate in FIG. 1. Referring to FIG. 1, an OCB Mode LCD 100 includes an active device array substrate 110, an opposite substrate 120, and a liquid crystal material 130. The opposite substrate 120 has an opposite electrode 122. The liquid crystal material 130 is disposed between the active device array substrate 110 and the opposite substrate 120. It should be noted that, the liquid crystal material 130 is identical to the above liquid crystal material.

Moreover, referring to FIGS. 1 and 2, the active device array substrate 110 includes a plurality of scan lines 112, a plurality of data lines 114, a plurality of thin film transistors 116, and a plurality of pixel electrodes 118. The thin film transistors 116 are respectively electrically connected to one of the scan lines 112 and one of the data lines 114. The pixel electrodes 118 are respectively electrically connected to one of the thin film transistors 116, so as to form a pixel unit P. Moreover, a chip 210 may be disposed on the active device array substrate 110, and may be electrically connected to the scan lines 112 and the data lines 114. In this manner, the pixel electrodes 118 of the active device array substrate 110 can be controlled by the chip 210 to have a voltage. Meanwhile, the opposite electrode 122 of the opposite substrate 120 is also powered on such that the opposite electrode 122 has another voltage. Therefore, an electric field can be formed between the active device array substrate 110 and the opposite substrate 120 (i.e., a voltage is applied to the liquid crystal material 130), so as to control the liquid crystal material 130.

In addition, the opposite substrate 120 may also include a color filter layer 124, which is disposed below the opposite electrode 122. Moreover, the opposite substrate 120 may further include a protective layer 126, which is located between the color filter layer 124 and the opposite electrode 122.

In another embodiment, the above color filter layer 124 is not necessarily disposed on the opposite substrate 120, but may also be disposed on the active device array substrate 110, and the color filter layer 124 may be located above or below the pixel units P.

In another embodiment, the OCB Mode LCD may also include a back light module (not shown) disposed on one side of the active device array substrate 110 or the opposite substrate 120.

In view of the above, since the liquid crystal material 130 of the OCB Mode LCD 100 of the present invention is identical to the above liquid crystal material, the OCB Mode LCD 100 has a low bright-state driving voltage and a high response speed. Therefore, as the OCB Mode LCD 100 requires a low bright-state driving voltage, it will be less likely for the electronic devices, such as the thin film transistors 116 and the chip 210, of the OCB Mode LCD 100 to be damaged due to a high driving voltage, and the service life of the electronic devices of the OCB Mode LCD 100 can thus be prolonged. In addition, as the OCB Mode LCD 100 has a high response speed, problems such as image sticking caused by the low response speed is less likely to arise when the OCB Mode LCD 100 displays dynamic images.

To sum up, the bend molecule of the liquid crystal material of the present invention can effectively reduce the bright-state driving voltage of the liquid crystal material and can also improve the response speed of the liquid crystal material. When the liquid crystal material of the present invention is applied to the OCB Mode LCD, the same advantages are also achieved. Therefore, as the OCB Mode LCD requires a low bright-state driving voltage, it will be less probable for the electronic devices of the OCB Mode LCD to be damaged due to a high driving voltage, and the service life of the electronic devices of the OCB Mode LCD can thus be prolonged. In addition, as the OCB Mode LCD has a high response speed, problems such as image sticking caused by the low response speed is less likely to arise when the OCB Mode LCD displays dynamic images.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A liquid crystal material, comprising:
   an optical compensated bend mode liquid crystal molecule; and
   a bend molecule, having a structure presented as formula (1):

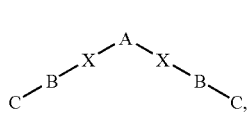

formula (1)

wherein the symbol A represents one of the following formulas:

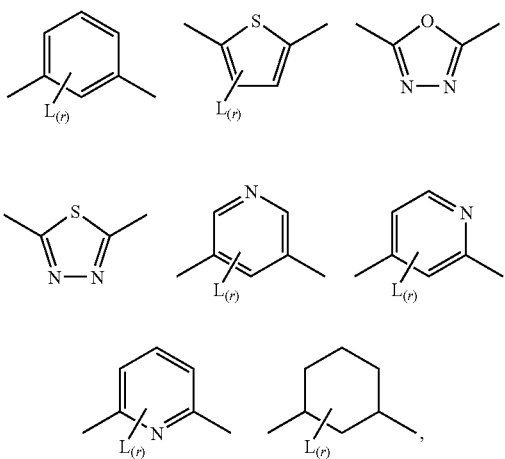

wherein the symbol L represents hydrogen or fluorine, and the value r is one, two, three, four, five, six, seven or eight; the symbol X represents carboxyl group;
   the symbol B represents one of the following formulas:

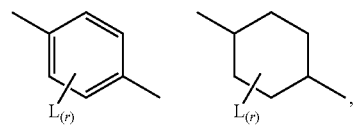

wherein the symbol L represents hydrogen or fluorine, and the value r is one, two, three, four, five, six, seven or eight; and
   the symbol C represents alkyl, alkoxyl, alkylcarbonyl or alkoxycarbonyl group with 1 to 12 carbon atoms.

2. The liquid crystal material according to claim 1, wherein the structure of the bend molecule has at least one of the following structures presented as formulas (2) to (5):

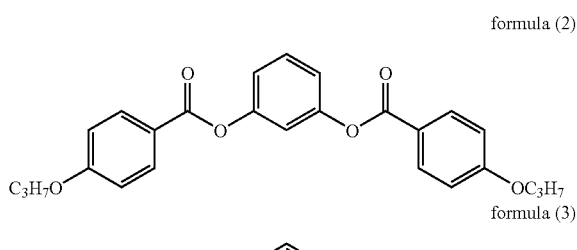

formula (2)

formula (3)

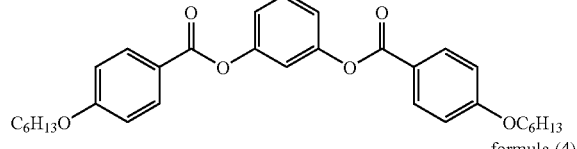

formula (4)

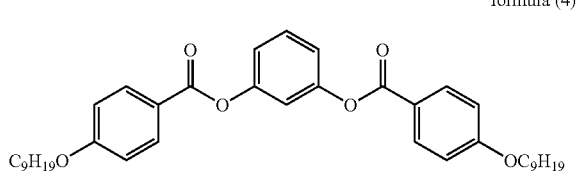

formula (5)

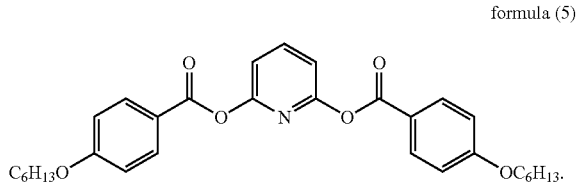

3. The liquid crystal material according to claim 1, wherein the weight ratio of the bend molecule to the optical compensated bend mode liquid crystal molecule is 0.01% to 5%.

4. The liquid crystal material according to claim 1, wherein the weight ratio of the bend molecule to the optical compensated bend mode liquid crystal molecule is 0.5%.

5. An optical compensated bend mode liquid crystal display (OCB Mode LCD), comprising:
   an active device array substrate;
   an opposite substrate, comprising an opposite electrode; and
   a liquid crystal material, disposed between the active device array substrate and the opposite substrate, wherein the liquid crystal material comprises:

an optical compensated bend mode liquid crystal molecule; and a bend molecule, having a structure presented as formula (1):

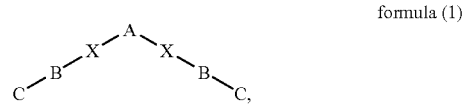

formula (1)

wherein the symbol A represents one of the following formulas:

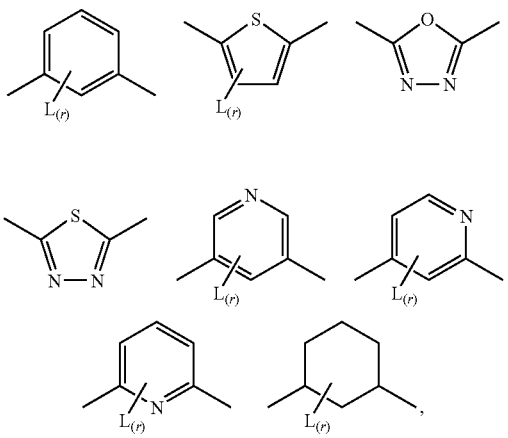

wherein the symbol L represents hydrogen or fluorine and, the value r is one, two, three, four, five, six, seven or eight; the symbol X represents carboxyl group;

the symbol B represents one of the following formulas:

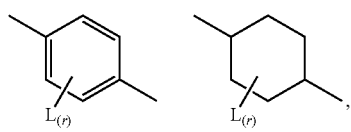

wherein, the symbol L represents hydrogen or fluorine, and the value r is one, two, three, four, five, six, seven or eight; and the symbol C represents alkyl, alkoxyl, alkylcarbonyl or alkoxycarbonyl group with 1 to 12 carbon atoms.

6. The OCB Mode LCD according to claim 5, wherein the structure of the bend molecule has at least one of the following structures presented as formulas (2) to (5):

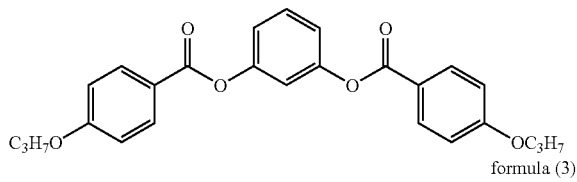

formula (2)

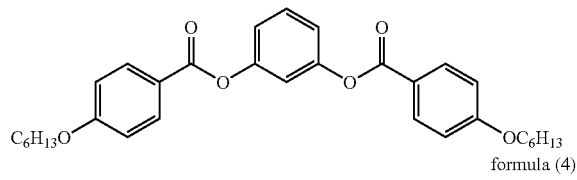

formula (3)

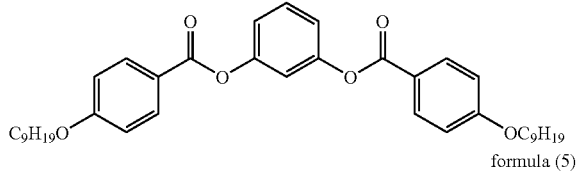

formula (4)

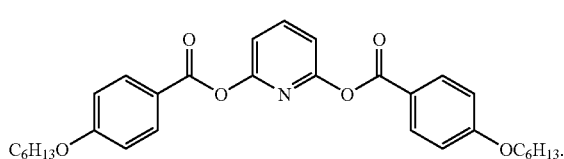

formula (5)

7. The OCB Mode LCD according to claim 5, wherein the weight ratio of the bend molecule to the optical compensated bend mode liquid crystal molecule is 0.01% to 5%.

8. The OCB Mode LCD according to claim 5, wherein the weight ratio of the bend molecule to the optical compensated bend mode liquid crystal molecule is 0.5%.

9. The OCB Mode LCD according to claim 5, wherein the opposite substrate further comprises a color filter layer disposed below the opposite electrode.

10. The OCB Mode LCD according to claim 5, wherein the active device array substrate comprises:
    a plurality of scan lines and a plurality of data lines;
    a plurality of thin film transistors, respectively electrically connected to one of the scan lines and one of the data lines; and
    a plurality of pixel electrodes, respectively electrically connected to one of the thin film transistors.

* * * * *